(12) United States Patent
Chan et al.

(10) Patent No.: US 8,920,633 B2
(45) Date of Patent: Dec. 30, 2014

(54) METHOD AND SYSTEM FOR OXIDATIVELY INCREASING CETANE NUMBER OF HYDROCARBON FUEL

(75) Inventors: Kin Meng Chan, Kuala Lampur (MY); Kamalul Arifin Yusof, Kajang Selangor (MY); Shahrul Niza Bin Abdul Rahim, Kuala Lampur (MY); Md Asraff Bin Abdul Karim, Teregganu (MY); Roger Kai Lott, Edmonton (CA)

(73) Assignee: Cetamax Ventures Ltd., Tsimshatsui, Kowloon (HK)

( * ) Notice: Subject to any disclaimer, the term of this patent is extended or adjusted under 35 U.S.C. 154(b) by 503 days.

(21) Appl. No.: 12/877,484

(22) Filed: Sep. 8, 2010

(65) Prior Publication Data
US 2011/0065969 A1 Mar. 17, 2011

Related U.S. Application Data

(60) Provisional application No. 61/243,053, filed on Sep. 16, 2009.

(51) Int. Cl.
| | |
|---|---|
| B01J 19/10 | (2006.01) |
| C10G 29/22 | (2006.01) |
| C10G 17/02 | (2006.01) |
| C10G 3/00 | (2006.01) |
| C10G 27/12 | (2006.01) |
| C10G 27/14 | (2006.01) |
| C10G 31/06 | (2006.01) |
| C10G 27/02 | (2006.01) |
| C10L 10/12 | (2006.01) |
| C10L 1/18 | (2006.01) |

(52) U.S. Cl.
CPC *C10G 3/00* (2013.01); *C10G 27/12* (2013.01); *C10G 27/14* (2013.01); *C10G 31/06* (2013.01); *C10G 27/02* (2013.01); *C10L 10/12* (2013.01); *C10L 1/1805* (2013.01); *Y02E 50/13* (2013.01); *C10G 2300/1014* (2013.01); *C10G 2300/1018* (2013.01); *C10G 2300/301* (2013.01); *C10G 2300/307* (2013.01); *C10L 2290/34* (2013.01); *C10L 2290/544* (2013.01); *C10G 2300/1007* (2013.01); *C10G 2300/1059* (2013.01); *C10G 2300/4081* (2013.01)
USPC ...... 208/133; 204/157.15; 208/134; 208/265; 208/266; 208/281; 208/282; 208/291

(58) Field of Classification Search
USPC ............ 204/157.15; 208/133, 134, 265, 266, 208/281, 282, 291
See application file for complete search history.

(56) References Cited

U.S. PATENT DOCUMENTS

| | | | |
|---|---|---|---|
| 4,723,963 A | 2/1988 | Taylor | |
| 5,114,434 A | 5/1992 | Praulus et al. | |
| 6,402,939 B1 | 6/2002 | Yen et al. | |
| 6,500,219 B1* | 12/2002 | Gunnerman | 44/904 |
| 7,300,566 B2* | 11/2007 | Gunnerman | 208/106 |
| 7,501,374 B2 | 3/2009 | Galiasso | |
| 2002/0148756 A1 | 10/2002 | Morris et al. | |
| 2004/0074812 A1* | 4/2004 | Cullen | 208/208 R |
| 2005/0160662 A1 | 7/2005 | Jordan | |
| 2006/0081501 A1 | 4/2006 | Kozyuk | |
| 2008/0173571 A1 | 7/2008 | Yen et al. | |
| 2008/0295394 A1 | 12/2008 | Furuta et al. | |
| 2009/0008295 A1 | 1/2009 | Kozyuk | |
| 2009/0044444 A1 | 2/2009 | Sugano | |
| 2009/0182159 A1 | 7/2009 | Gordan et al. | |
| 2011/0220547 A1 | 9/2011 | Bourane et al. | |
| 2011/0226670 A1 | 9/2011 | Cullen | |

FOREIGN PATENT DOCUMENTS

| | | |
|---|---|---|
| WO | 02/26916 | 4/2002 |
| WO | WO 2012-027820 A1 | 3/2012 |

OTHER PUBLICATIONS

P. Mello et al., Ultrasound-Assisted Oxidative Process for Sulfur Removal from Petroleum Product Feedstock, 16 Ultrason. Sonochem. 732-736 (2009).*
International Search Report and Written Opinion dated Jul. 27, 2011 issued in PCT/US2011/002398, filed on Sep. 10, 2010.
Huang et al., "Chemical Oxidation of Dibenzothiophene with a Directly Combined Amphiphilic Catalyst for Deep Desulfurization", Ind. Eng. Chem. Res. 2006, 45, 1880-1885.
Deshpande et al., "Ultrasoun-Assisted, Base-Catalyzed Oxidation of 4,6-Dimethyldibenzothiophene in a Biphasic Diesel—Acetonitrile System", Energy & Fuel 2005, 19, 28-34.
Knudsen et al., "Ultra Deep Desulfurnizaiton of Diesel: How an understanding of the underlying kinetics can reduce investments costs", at least as early as Jul. 20, 2009.
National Fuel Quality Standards, Measuring Cetane Number: options for diesel and alternative diesel fuels, Discussion Paper, The Department of the Environment and Heritage, Apr. 2004.
Utlrasonic Alternative to Hyrodesulfurization, http://www.hielscher.com/utlrasonics/oil_desulfurization_01.htm?gclid=C . . . at least as early as Jul. 20, 2009.
TransEnergy Consulting, "2.3 Oxygenates for Diesel Fuels", Dec. 27, 2005, pp. 10-11.

(Continued)

*Primary Examiner* — Randy Boyer
(74) *Attorney, Agent, or Firm* — Workman Nydegger (57) ABSTRACT

High energy (e.g., ultrasonic) mixing of a liquid hydrocarbon feedstock and reactants comprised of an oxidation source, catalyst and acid yields a diesel fuel product or additive having substantially increased cetane number. Ultrasonic mixing creates cavitation, which involves the formation and violent collapse of micron-sized bubbles, which greatly increases the reactivity of the reactants. This, in turn, substantially increases the cetane number compared to reactions carried out using conventional mixing processes, such as simple mechanical stirring. Alternatively, an aqueous mixture comprising water and acid can be pretreated with an oxidation source such as ozone and subjected to ultrasonic cavitation prior to reacting the pretreated mixture with a liquid hydrocarbon feedstock.

31 Claims, 6 Drawing Sheets

(56) References Cited

OTHER PUBLICATIONS

Special Technologies: Science and production association, http://www.spectech.dn.ua/en-prod_bio.htm?gclid=CJz1tq6D4ZsCFQKH . . . at least as early as Jul. 20, 2009.
Hielscher, "Ultrasonic Production of Nano-Sized Dispersions and Emulsions", ENS'05, Dec. 14-16, 2005.

Gogate et al., "Cavitation: A technology on the horizon", Current Science, vol. 91, No. 1, Jul. 10, 2006.
International Search Report & Written Opinion for PCT Application No. PCT/IB2013/002819, Mailed Date: May 23, 2014, Filed Date: Jul. 23, 2013, 12 pages.

* cited by examiner

METHOD AND SYSTEM FOR OXIDATIVELY INCREASING CETANE NUMBER OF HYDROCARBON FUEL

CROSS-REFERENCE TO RELATED APPLICATIONS

This application claims the benefit of earlier filed U.S. Provisional Application No. 61/243,053, filed Sep. 16, 2009, the disclosure of which is incorporated herein in its entirety.

BACKGROUND OF THE INVENTION

1. The Field of the Invention

The present invention is in the field of hydrocarbon fuels, more particularly in the field of processing hydrocarbons, such as diesel and biodiesel, in order to increase the cetane number.

2. The Relevant Technology

Cetane number is a measurement of the combustion quality of diesel fuel during compression ignition. It is a significant expression of diesel fuel quality among a number of other measurements that determine overall diesel fuel quality. Cetane number is actually a measure of a fuel's ignition delay, which is the time period between the start of injection and start of combustion (ignition) of the fuel. For any given diesel engine, a higher cetane fuel will have a shorter ignition delay period than a lower cetane fuel.

Generally, diesel engines run well with a cetane number from 40 to 55. Fuels with higher cetane numbers and shorter ignition delays provide more time for the fuel combustion process to be completed. This, in turn, increases the extent and efficiency of combustion. Higher speed diesel engines operate more effectively when using higher cetane number fuels. Nevertheless, there is typically no performance or emission advantage when the cetane number is increased beyond approximately 55. Beyond this point, the fuel's performance hits a plateau.

By way of background, cetane is an un-branched, open chain, alkane molecule that ignites very easily under compression, so it was assigned a cetane number of 100. Conversely, alpha-methyl napthalene was assigned a cetane number of 0. All other hydrocarbons in diesel fuel are indexed to cetane as to how well they ignite under compression. The cetane number therefore measures how quickly the fuel starts to burn (auto-ignites) under diesel engine conditions (i.e., compression and temperature). Since there are hundreds of components in diesel fuel, with each having a different cetane quality, the overall cetane number of the diesel is the average cetane quality of all the components. There is typically very little actual cetane in diesel fuel.

In North America, most states adopt ASTM D975 as their diesel fuel standard, and the minimum cetane number is set at 40, with typical values in the 42-45 range. Premium diesel fuels may or may not have higher cetane numbers, which is supplier dependent. Premium diesel fuels often include additives to improve cetane number and lubricity, detergents to clean the fuel injectors and minimize carbon deposits, water dispersants, and other additives depending on geographical and seasonal needs.

In Europe, diesel cetane numbers were set at a minimum of 38 in 1994 and 40 in 2000. The current standard for diesel sold in Europe is determined by EN 590, with a minimum cetane index of 46 and a minimum cetane number of 51. Premium diesel fuel can have a cetane number as high as 60 in Europe.

Additives such as alkyl nitrates (e.g., 2-ethyl hexyl nitrate), di-tert-butyl peroxide, and dimethyl ether are commonly used as additives to raise the cetane number. Additives such as 2-ethyl hexyl nitrate are very expensive, costing approximately $2200/ton, and cannot be used in quantities greater than about 0.2% of the diesel fuel without becoming cost prohibitive.

Biodiesel from vegetable oil sources have been recorded as having a cetane number range of 46 to 52. Animal-fat based biodiesels cetane numbers range from 56 to 60.

The cetane number of diesel fuel can also be increased by processing diesel fuel having a lower cetane number to yield a diesel fuel having a higher cetane number. For example, U.S. Pat. No. 5,114,434 to Praulus et al. describes a process by which viscoreduced diesel fuel is contacted with hydrogen peroxide in a reactor that includes a stirring mechanism. While the process disclosed by Praulus et al. effectively increased the cetane number, the amount of increase was modest (i.e., the cetane number was increased from 39 to 50 in one example and from 39 to 53.5 in another). Moreover, the residence time in the reactor was quite long, being 5 hours or more.

BRIEF SUMMARY OF THE INVENTION

It has now been unexpectedly found that much a higher increase in the cetane number of liquid hydrocarbons is possible when utilizing an oxidative process in combination with ultrasonic cavitation compared to reactors that employ conventional stirring. According to one embodiment, the reaction is essentially a two-phase reaction including an oil phase and an aqueous phase. In another embodiment, it may be advantageous to introduce a third phase comprised of ozone gas. Ultrasonic mixing results in "cavitation" in which tiny micron size water bubbles are formed and collapse, which causes an intense release of energy.

The result is a product that can be characterized as "super cetane diesel", as it has a cetane number that is substantially higher than 55, typically higher than about 75, preferably higher than about 100. The super cetane diesel produced by the inventive process can be used as a blending stock for diesel fuels having lower cetane numbers in order to yield blended diesel fuels having a desired final cetane number.

According to one embodiment, a method for oxidatively increasing the cetane number of a liquid hydrocarbon includes:

providing a liquid hydrocarbon feedstock having an initial cetane number;

introducing the liquid hydrocarbon feedstock into a reactor together with an oxidation source, catalyst (plus fine filterable solids to enhance cavitation), and acid; and intimately mixing the liquid hydrocarbon feedstock, oxidation source, catalyst, and acid by means of cavitation in order to oxygenate the liquid hydrocarbon feedstock and thereby yield a modified liquid hydrocarbon having a final cetane number that it at least about 30% higher than the initial cetane number.

According to another embodiment, a method for oxidatively increasing the cetane number of a liquid hydrocarbon includes:

introducing an oxidation source and an aqueous mixture comprised of water and acid into an ultrasonic cavitation reactor;

subjecting the aqueous mixture and oxidation source to ultrasonic cavitation to yield a pretreated aqueous mixture having oxidating radicals;

introducing the pretreated aqueous mixture and a liquid hydrocarbon feedstock having an initial cetane number into an upgrading reactor; and mixing together the liquid hydrocarbon feedstock and the pretreated aqueous mixture within the upgrading reactor in order to oxygenate the liquid hydrocarbon feedstock and thereby yield a modified liquid hydrocarbon having a final cetane number that it at least about 30% higher than the initial cetane number.

According to one embodiment, the liquid hydrocarbon feedstock has a boiling point in a range of about 150° C. to about 380° C. Exemplary liquid hydrocarbon feedstocks include one or more of refinery streams, straight petroleum runs, thermally cracked hydrocarbons, catalytically cracked hydrocarbons, hydrocracked hydrocarbons, biodiesels, vegetable oils, palm oil, and animal fats. Alternatively or in addition, the liquid hydrocarbon feedstock can be a material produced by visbreaking a material such as bright stock, used lubricating oil, or gas oil with a boiling point in a range of about 200° C. to about 500° C.

The inventive methods utilize an oxidation source in order to oxygenate the liquid hydrocarbon feedstock. The oxidation source may be one or more of aqueous hydrogen peroxide, an organic peroxide, an inorganic peroxide, or ozone. The oxidation source generates hydroxyl radicals and/or oxygen radicals in order to oxygenate the liquid hydrocarbon feedstock. Because mixing ozone and liquid hydrocarbon in a reactor can form an explosive mixture, the use of ozone is best suited for the second embodiment in which the aqueous mixture is pretreated by mixing with ozone and subjecting the mixture to ultrasonic cavitation.

The inventive methods utilize a catalyst that catalyzes the oxidation process. The catalyst may be one or more of iron, nickel, vanadium, or molybdenum, typically as a solid particulate or supported catalyst.

The inventive methods utilize an acid to promote the oxidation reaction. The acid may be an organic acid or an inorganic acid. Examples of organic acids include one or more of acetic acid, formic acid, oxalic acid, or benzoic acid. Examples of inorganic acids include one or more of sulfuric acid, nitric acid, or hydrochloric acid.

The inventive methods further include separating the modified liquid hydrocarbon from light hydrocarbon gases, water, catalyst, and oxidation source. According to one embodiment, the separation is carried out by means of phase separation. Unspent oxidation source, catalyst and acid can be recycled back into the reactor for further use in oxidatively treating the liquid hydrocarbon and increasing cetane number. It is important to note that one skilled in the art would use reaction conditions that minimize the formation of a tight emulsion. It is also desirable to prevent excessive oxidation of the diesel, which can result in formation of polymer or precipitates.

The diesel product separated from light hydrocarbon gases, water, catalyst and oxidation source can be further purified by extraction using a polar solvent, such as a lower alcohol (e.g., methanol), to remove over-oxidized materials. Over-oxidized hydrocarbons are more polar and less stable than the desirable diesel product. If left in the diesel, over-oxidized hydrocarbons can continue to react and form undesirable precipitates. The methanol and diesel separate into two phases, a phase of higher polarity containing the methanol and more highly oxidized hydrocarbons and an oil phase that is more hydrophobic and includes less oxidized diesel and/or other hydrocarbons. Residual water can also be removed in the more hydrophilic methanol function or it can be removed using a dehydrator.

By using the inventive process, the cetane number of a starting feedstock material can be increased by at least about 15%, preferably by at least about 20%, more preferably by at least about 30%, even more preferably by at least about 50%, and most preferably by at least about 75%. Such processes also result in an increase in cetane number of at least about 7.5, preferably at least about 10, more preferably at least about 15, even more preferably at least about 25, especially at least about 50, and most preferably at least about 75.

In many cases, the resulting product has a cetane number so high that it is best suited as a blending additive to raise the cetane number of a lower cetane number diesel fuel rather than as a diesel fuel by itself. According to one embodiment, the final blending stock can have a cetane number greater than about 60, preferably greater than about 75, more preferably greater than about 90, and most preferably greater than about 125.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

A detailed description of the method and system of the invention for increasing the cetane number of a liquid hydrocarbon will now be provided with specific reference to figures illustrating preferred embodiments of the invention.

Figure 1:
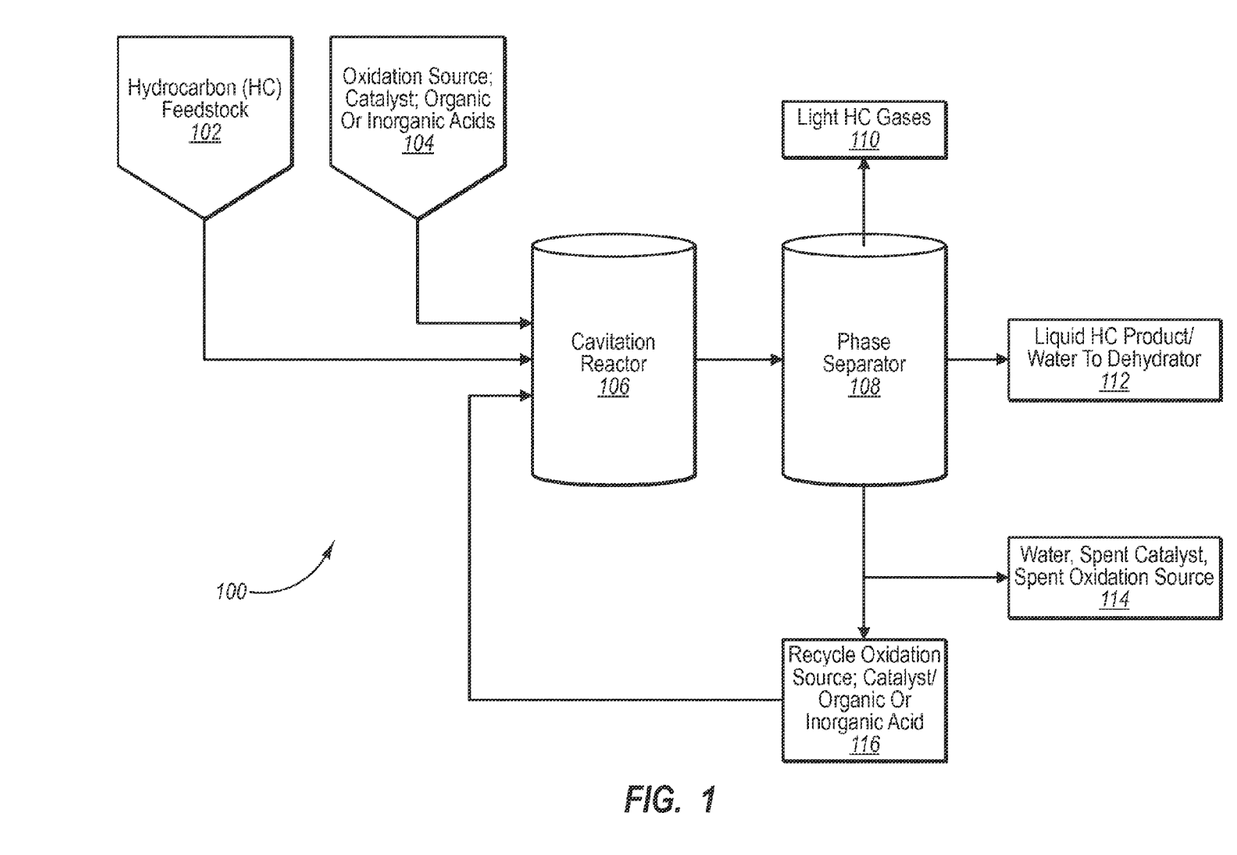
FIG. 1 schematically illustrates an exemplary system for oxidatively increasing the cetane number of a liquid hydrocarbon.

Reference is now made to FIG. 1, which schematically illustrates an exemplary system 100 for increasing the cetane number of a liquid hydrocarbon. According to this embodiment, a liquid hydrocarbon (HC) feedstock 102 is fed into a cavitation reactor 106 together with additional reactants 104, which typically include an oxidation source, a catalyst, and an organic or inorganic acid. Although FIG. 1 depicts a single cavitation reactor 106, it will be appreciated that a series of rectors can be utilized, including multiple cavitation reactors or a cavitation reactor and one or more reactors that include a conventional stirring mechanism.

According to one embodiment, the liquid hydrocarbon feedstock will have a boiling point, or boiling range, in a range of about 150° C. to about 380° C. Although not a necessary feature of the liquid hydrocarbon feedstock, but due to the nature of the materials being treated, the liquid hydrocarbon feedstock may have sulfur content in a range of about 10 to about 5000 ppm. The inventive methods and systems aim to minimize the oxidation of sulfur-containing compounds in the feedstock. Excessive oxidation can transform the sulfur-containing compounds into oxygenated compounds that are more water rather than oil soluble, thereby reducing the yield of the desired supercetane product.

The liquid hydrocarbon feedstock may be from a refinery stream (e.g., a straight run, thermally cracked hydrocarbons, catalytically cracked hydrocarbons, or hydrocracked hydrocarbons), biodiesels, vegetable oils, or animal fats. Examples of vegetable oils that can be used in connection with the inventive methods and systems include palm oil, colza oil, pine oil, soya oil, sunflower oil, maize oil, safflower oil, cottonseed oil, coriander oil, mustard oil, or tall oil. An example of animal fat is tallow oil.

Examples of biodiesels that may be used as part or all of the liquid hydrocarbon feedstock include biodiesels created via chemical reaction of methanol with vegetable oil according to the following reaction:

Methanol+oil→biodiesel fuel

The result is a fatty acid methyl ester having the formula $C_mH_nO_2CH_3$.

Alternatively, or in addition, the liquid hydrocarbon feedstock may be generated from a visbreaker tailored to crack bright stock, used lubricating oil, or gas oil with a boiling point in a range of about 200° C. to about 500° C. The liquid hydrocarbon feedstock may include or be derived from other materials, such as light catalytic cracking gas oil, light coker gas oil, light virgin gas oil, or kerosene. It will be appreciated that a wide variety of materials may be used for the liquid hydrocarbon feedstock so long as they yield a diesel fuel product having an increased cetane number.

Examples of an "oxidation source" as used herein is a peroxide material, which is typically a compound of the molecular structure:

$R_1$—O—O—$R_2$ wherein, $R_1$ and $R_2$ are singly or collectively a hydrogen atom, an organic group, or an inorganic group. Examples of peroxides in which $R_1$ is an organic group and $R_2$ is a hydrogen include water-soluble peroxides such as methyl hydroperoxide (i.e., peroxy formic acid), ethyl hydroperoxide (i.e., peroxy acetic acid), isopropyl hydroperoxide, n-butyl hydroperoxide, sec-butyl hydroperoxide, tert-butyl hydroperoxide, 2-methoxy-2-propyl hydroperoxide, tert-amyl hydroperoxide, and cyclohexyl hydroperoxide. Examples of peroxides in which $R_1$ is an inorganic group and $R_2$ is a hydrogen include peroxonitrous acid, peroxophosphoric acid, and peroxosulfuric acid. A preferred peroxide is hydrogen peroxide (i.e., in which both of $R_1$ and $R_2$ are hydrogen atoms). A wide variety of different peroxides or other oxidation sources can be utilized so long as they assist in oxygenating the liquid hydrocarbon feedstock and result in a diesel fuel product having increased cetane number. Ozone can function as the oxidation source but is best suited for pretreating an aqueous mixture comprising water and acid (FIGS. 4 and 5) rather than mixing directly with a liquid hydrocarbon feedstock, as that can form an explosive mixture.

According to one embodiment, the amount of peroxide or other oxidation source used per kilogram of liquid hydrocarbon feedstock may be less than 300 g, though typically it is at least about 10 g and may range from about 25 g to 300 g hydrogen peroxide per kilogram of liquid hydrocarbon feedstock. The hydrogen peroxide may be employed in the form of an aqueous solution containing, for example, and most typically, from approximately 10% to 70% by weight of hydrogen peroxide. If a different peroxide is used in the absence of hydrogen peroxide, it is typically employed in the same molar quantities as hydrogen peroxide. If a different peroxide is used in combination with hydrogen peroxide, the cumulative molar ratio of such other peroxide and hydrogen peroxide can be the same as that of hydrogen peroxide used by itself. If ozone is used in combination with hydrogen peroxide, the concentration of hydrogen peroxide may be less than 50%. Generally, it is not recommended to use ozone alone as the oxidation source because the combination of hydrocarbon and ozone can create an explosive environment in the process. If ozone is utilized in the cavitation reactor 106, the reactor is advantageously equipped with a conduit or other means for venting excess ozone through the top of the cavitation reactor 106 (See FIG. 4, elements 408, 413).

The acid utilized may be an organic carboxylic acid, for example an acid selected from among formic acid, acetic acid, or propionic acid. Alternatively, or in addition, the acid may be an inorganic acid, for example an acid selected from sulfuric acid, nitric acid, or hydrochloric acid. Formic acid is a preferred organic acid. Sulfuric acid is a preferred inorganic acid. The molar ratio of acid/hydrogen peroxide preferably ranges from about 0.01 to about 1, and even more preferably from about 0.1 to about 0.5.

The catalyst may be any catalyst that can promote the oxidation of the liquid hydrocarbon feedstock in the presence of the oxidation source and acid. Examples of suitable catalyst metals include, but are not limited to, iron, nickel, vanadium and molybdenum. The catalysts may be in the form of solid particulates, either alone or on an appropriate support material (e.g., silica or alumina). Alternatively, the catalysts may be in the form of fine particulates, such as ferric oxide.

The liquid hydrocarbon feedstock 102 will comprise the oil phase entering the cavitation reactor 106, and the oxidation source, catalyst and organic or inorganic acid will comprise the aqueous phase entering the cavitation reactor 106. The catalyst may also form a separate solid phase before or during the reaction.

The cavitation reactor 106 can be any reactor that is able to create cavitation with intimate, high energy mixing of the oil phase and oxidation source in the aqueous phase within the reactor. The reactor will also preferably generate cavitation in the liquid hydrocarbon/oxidation source. According to one embodiment, the cavitation reactor 106 is an ultrasonic cavitation reactor that generates acoustic cavitation. According to another embodiment, the cavitation reactor 106 includes a spinning rotor capable of creating mechanical cavitation. According to yet another embodiment, the cavitation reactor 106 is configured to generate cavitation by means of an oscillating magnetic field. Cavitation can alternatively be created by hydrodynamic flow of the liquid reactants. In other embodiments, the cavitation reactor 106 can employ optic cavitation (e.g., by laser pulses) or particle cavitation (e.g., by proton or neutrino pulses).

The operating temperature of the cavitation reactor can be in a range of about 20° C. to about 200° C., preferably in a range of about 30° C. to about 180° C., and more preferably in a range of about 40° C. to about 80° C. In order to control the temperature inside the cavitation reactor, it may be desirable to utilize cooling means known in the art, such as, by way of example, one or more cooling or heat exchange coils (e.g., utilizing liquid water) positioned within the reactor.

The operating pressure of the cavitation reactor can be in a range of about 1 bar to about 30 bars, preferably in a range of about 3 bars to about 25 bars, and more preferably in a range of about 5 bars to about 20 bars.

Referring to FIG. 1, the reactants are maintained within the cavitation reactor 106 for a time sufficient to carry out the desired oxygenation reaction in order to raise the cetane number of the liquid hydrocarbon product relative to the liquid hydrocarbon feedstock. The reaction time is typically in a range of about 3 minutes to about 90 minutes, preferably in a range of about 5 minutes to about 60 minutes, and more preferably in a range of about 8 minutes to about 40 minutes.

In general, it will be desirable to control the temperature, pressure and reaction time in order to promote beneficial oxygenation reactions while substantially preventing detrimental oxygenation reactions. For example, beneficial oxygenation reactions include oxygenating week H—C bonds of aromatic and hydroaromatic compounds, particularly at the benzylic position. Such oxygenation reactions increase the cetane number of the diesel. Examples of detrimental oxygenation reactions that decrease the cetane number of the diesel include oxidation of strong primary, secondary and tertiary alkyl H—C bonds found in paraffins and cycloparaffins, or oxidation of aromatics at non-benzylic positions, such as in the ring, to form phenol. In order to promote thermal and storage stability, it may be advantageous to keep the oxygenate level between about 0.5% to about 1%.

Figure 2:
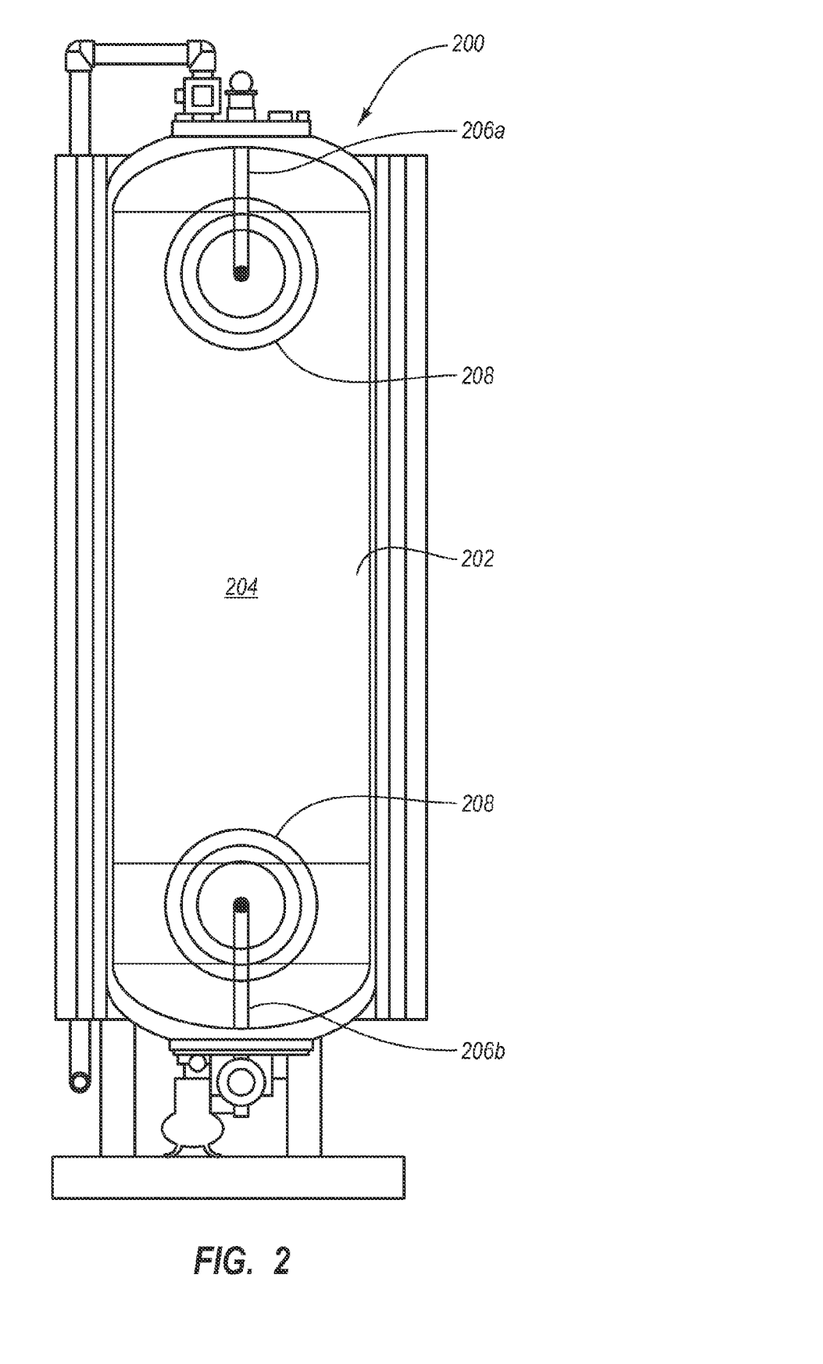
FIG. 2 schematically illustrates an exemplary reactor that utilizes ultrasound to create cavitation and intimately mix a liquid hydrocarbon and oxidation source.

One exemplary embodiment of an ultrasonic reactor is more particularly shown in FIG. 2. Reactor 200 shown in FIG. 2 includes a reactor vessel 202 containing reactants 204. The reactants include an oil phase and an aqueous phase, and possibly also a gaseous phase, as described herein. A first ultrasonic emitter 206a is positioned at the top end of reactor vessel 202, and a second ultrasonic emitter 206b is positioned at the bottom end of reactor vessel 202. The ultrasonic emitters 206 produce ultrasonic waves 208, which propagate throughout the entire volume of reactor vessel 202. The ultrasonic waves 208 and waves created by cavitation cause intimate, high energy mixing of the oil and aqueous reactants 204 within the reactor vessel 202.

In general, ultrasonic energy in accordance with the reaction vessel 106 of inventive system 100 is applied by the use of ultrasonics, which are sound-like waves whose frequency is above the range of normal human hearing, i.e., above 20 kHz (20,000 cycles per second). Ultrasonic energy with frequencies as high as 10 gigahertz (10,000,000,000 cycles per second) has been generated, but for purposes of this invention, useful results will be achieved with frequencies in a range of about 20 kHz to about 200 kHz, and preferably in a range of about 20 kHz to about 50 kHz. Ultrasonic waves can be generated from mechanical, electrical, electromagnetic, or thermal energy sources. The intensity of the sonic energy may also vary widely. For the purposes of this invention, desired results will generally be achieved with an intensity ranging from about 30 watts/cm$^2$ to about 300 watts/cm$^2$, or preferably from about 50 watts/cm$^2$ to about 100 watts/cm$^2$. One exemplary electromagnetic source can be a magnetostrictive transducer, which converts magnetic energy into ultrasonic energy by applying a strong alternating magnetic field to certain metals, alloys or ferrites. The typical electrical source is a piezoelectric transducer, which uses natural or synthetic single crystals (such as quartz) or ceramics (such a barium titanate or lead zirconate) and applies an alternating electrical voltage across opposite faces of the crystal or ceramic to cause an alternating expansion and contraction of crystal or ceramic at the impressed frequency. The various methods of producing and applying ultrasonic energy, and commercial suppliers of ultrasound equipment, are well known among those skilled in the use of ultrasound.

One exemplary ultrasonic reactor is available from Hielscher Ultrasonics GmbH, which is located in Teltow, Germany. According to the product literature relating to this product, the exposure of liquids to ultrasonic waves of high intensity causes acoustic cavitation. "Acoustic cavitation" (and other forms of "cavitation") is the formation and subsequent violent collapse of small vacuum (cavitation) bubbles. Locally, extreme conditions arise from the violent collapse of each bubble. Localized temperatures can be as high as 5000 Kelvin. Localized pressures can be up to 2000 atmospheres. Liquid jets can form at up to 1000 km/hr. Such conditions promote a better surface chemistry of catalysts by enhancing micro-mixing. In particular, the high local temperature changes the chemical reaction kinetics of the oxidation process.

After the liquid hydrocarbon has been converted into a liquid hydrocarbon product of higher cetane number (e.g., diesel fuel additive), the reactants are transferred from the cavitation reactor 106 into a phase separator 108. The phase separator causes or permits different fractions to separate into phases, thereby effecting their separation. Light hydrocarbon gases 110 are removed from the top because they are volatile and in gaseous form rather than liquid.

The main liquid hydrocarbon product 112 is removed by phase separation from the main aqueous phase. The liquid hydrocarbon product 112 will contain both liquid hydrocarbon product and residual water, which is removed using a dehydrator known to those of skill in the art. Dehydration can be effected using heat and/or chemical extraction.

The main aqueous phase can be further divided using known means into a first fraction 114 comprised of water, spent catalyst, and spent oxidation source and a second fraction 116 comprised of recycle oxidation source, recycle catalyst, and recycle organic or inorganic acid. The second fraction 116 comprised of recycle materials can be returned to the ultrasonic reactor 106.

The dehydrated liquid hydrocarbon product can be further purified by extracting over-oxidated hydrocarbons with a polar solvent, such as a lower alcohol (e.g., methanol, ethanol or isopropyl alcohol) to form a washed hydrocarbon product. The more polar constituents, such as over-oxidized hydrocarbons and residual water, collect in the methanol phase, which separates from the more hydrophobic oil phase containing less oxidized hydrocarbons. It may be desirable to remove over-oxidized hydrocarbons because they are more polar and less stable than the desired liquid hydrocarbon product. If left in the hydrocarbon product, the over-oxidized hydrocarbons can continue to react, resulting in undesirable precipitates. In some cases, extraction with a polar solvent can also remove residual water from the liquid hydrocarbon product.

Figure 3:
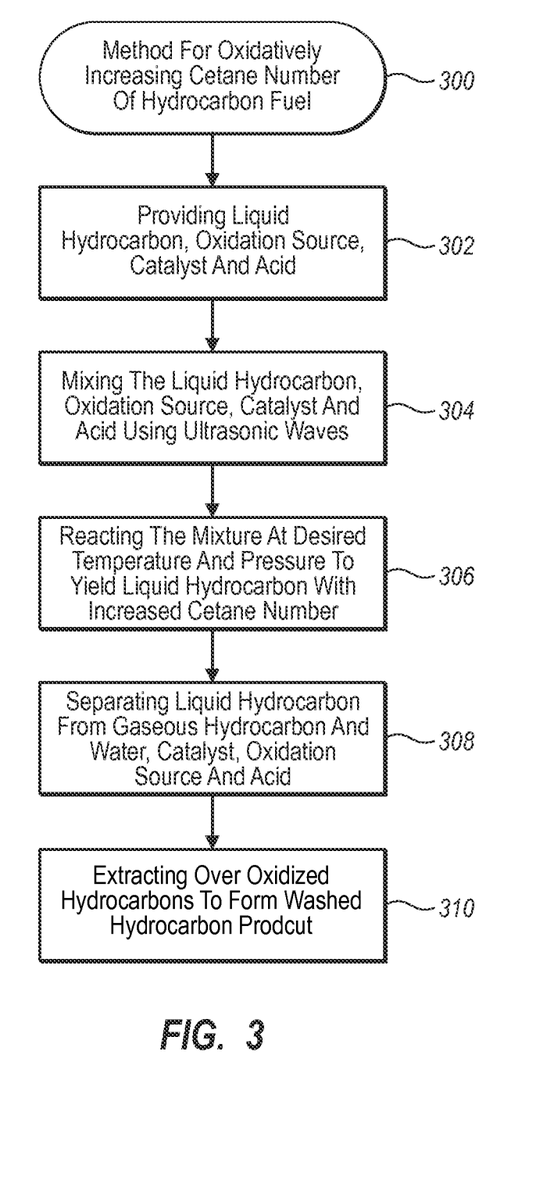
FIG. 3 is a flow diagram of an exemplary method of oxidatively increasing the cetane number of a liquid hydrocarbon.

FIG. 3 is a flow chart that illustrates an exemplary method 300 of increasing the cetane number of a liquid hydrocarbon (e.g., using the system 100 shown in FIG. 1 and/or the ultrasonic reactor 200 shown in FIG. 2). A first step 302 includes providing a liquid hydrocarbon, oxidation source, catalyst and acid as described herein. The second step 304 involves mixing the liquid hydrocarbon, oxidation source, catalyst and acid using ultrasonic waves, or ultrasonic cavitation to effect high energy mixing. This results in the third step 306, which includes reacting the mixture at a desired temperature, pressure and time to yield a liquid hydrocarbon product having increased cetane number. The fourth step 308 includes separating the liquid hydrocarbon from gaseous hydrocarbons and also water, catalyst, oxidation source, and acid. The fifth step 310 includes extracting over-oxidized hydrocarbons from the liquid hydrocarbon to form a washed hydrocarbon product in the oil phase and over-oxidized hydrocarbons in the polar solvent phase. Removing the over-oxidized hydrocarbons yields a more stable end product.

Figure 4:
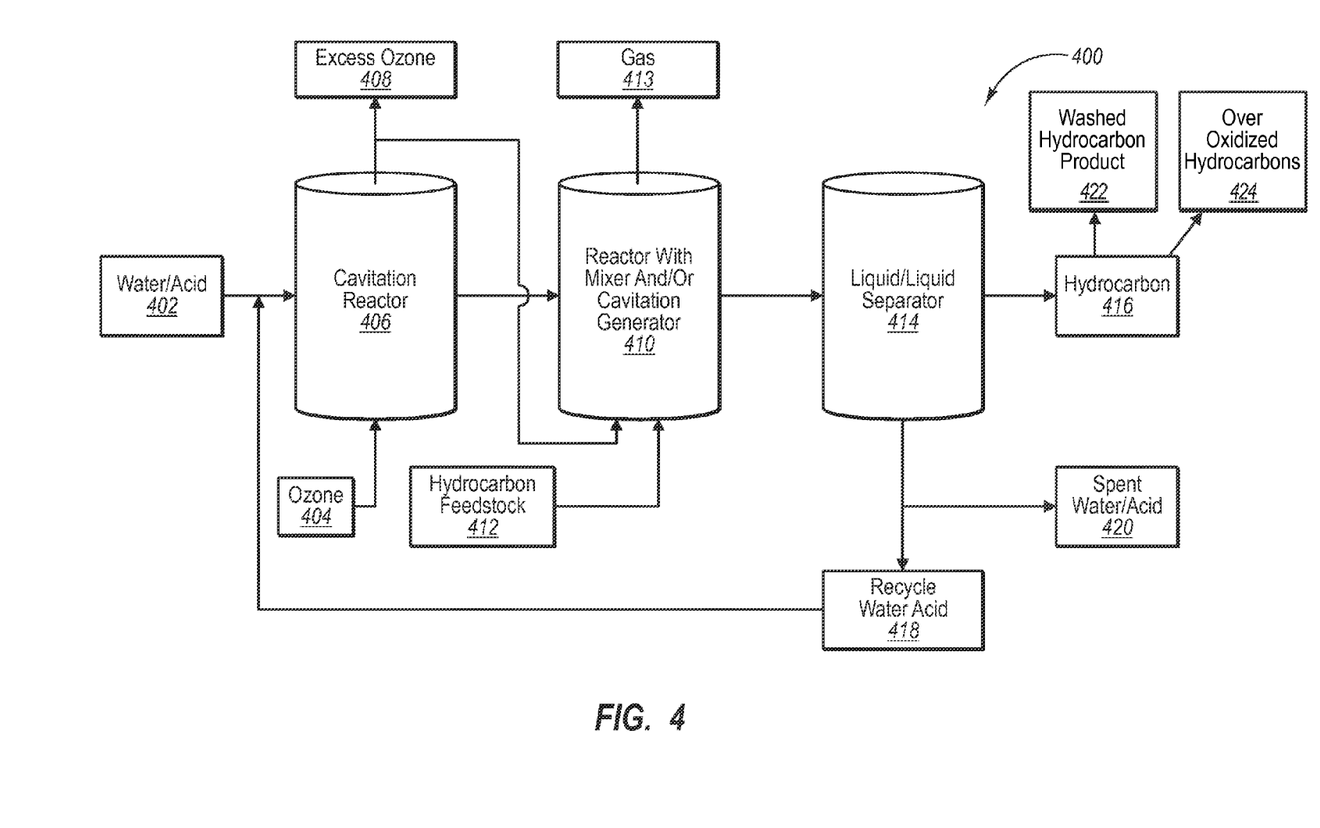
FIG. 4 schematically illustrates an alternative exemplary system for oxidatively increasing the cetane number of a liquid hydrocarbon.

FIG. 4 schematically depicts an alternative embodiment of a reaction system 400 for increasing the cetane number of a liquid hydrocarbon. In this embodiment, an aqueous mixture 402 comprised of water and an organic or inorganic acid is pretreated by mixing and reacting the aqueous mixture 402 with ozone 404 within a pretreating cavitation reactor 406. The pretreating cavitation reactor 406 can be any reactor that is able to cause the ozone to form reactive hydroxyl radicals and/or oxygen radicals within the pretreated aqueous mixture. Excess ozone 408 can be removed from the top of cavitation reactor 406 through a conduit or other venting means known in the art. One example of a cavitation reactor is an ultrasound reactor, which may be the same or similar to the ultrasound reactor described above and used in reacting the liquid hydrocarbon feedstock with the oxidation source. Other cavitation reactors can create cavitation by a spinning rotor, oscillating magnetic field, hydrodynamic flow, optic cavitation, or particle cavitation.

The pretreatment time of the aqueous mixture with ozone in the pretreatment reactor 406 can be in a range of about 30 seconds to about 10 minutes, preferably in a range of about 45 seconds to about 8 minutes, and more preferably in a range of about 1 minute to about 5 minutes. The temperature may be room temperature (i.e., about 20-25° C.) and the pressure may be 1 bar to about 30 bars, preferably about 3 bars to about 25 bars, and more preferably about 5 bars to about 20 bars.

The pretreated aqueous mixture from pretreatment reactor 406 and liquid hydrocarbon feedstock 412 are introduced into upgrading reactor 410, which includes means for mixing the liquid hydrocarbon feedstock and pretreated aqueous mixture together. At least some of the excess ozone 408 from pretreatment reactor 406 can also be introduced into upgrading reactor 410. According to one embodiment, mixing may be provided at least in part by mechanical stirring. According to another embodiment, mixing may be provided at least in part by ultrasonic cavitation. A combination of mechanical mixing and ultrasonic cavitation may be provided within upgrading reactor 410 in order to promote beneficial oxygenation reactions between hydroxyl radicals provided by the pretreated aqueous mixture and the liquid hydrocarbon. As in the embodiment described above relative to FIG. 1, a series of upgrading reactors can be included, which utilize one or both of mechanical stirring or ultrasonic cavitation. The reactants are maintained within the upgrading reactor 410 for a time and at a temperature and pressure sufficient to carry out the desired oxygenation reaction in order to raise the cetane number of the liquid hydrocarbon product relative to the liquid hydrocarbon feedstock (e.g., see time, temperature and pressures set forth above relative to the embodiment of FIG. 1). Gases 413 can be removed from the top of upgrading reactor 410.

After the liquid hydrocarbon has been converted into a liquid hydrocarbon product having a higher cetane number (e.g., diesel fuel additive), the reactants are transferred from the upgrading reactor 410 into a liquid/liquid separator 414, which separates an upgraded hydrocarbon product 416 from water and acid. Recycle water and acid 418 can be introduced back into cavitation reactor 406. Excess (or "spent") water and acid 420 are separated from the recycle water and acid and discarded. The hydrocarbon product 416 can be further washed using a polar solvent (e.g., methanol) to yield a washed hydrocarbon product 422 that is separated by phase separation from over-oxidized hydrocarbons 424 in a polar solvent phase.

Figure 5:
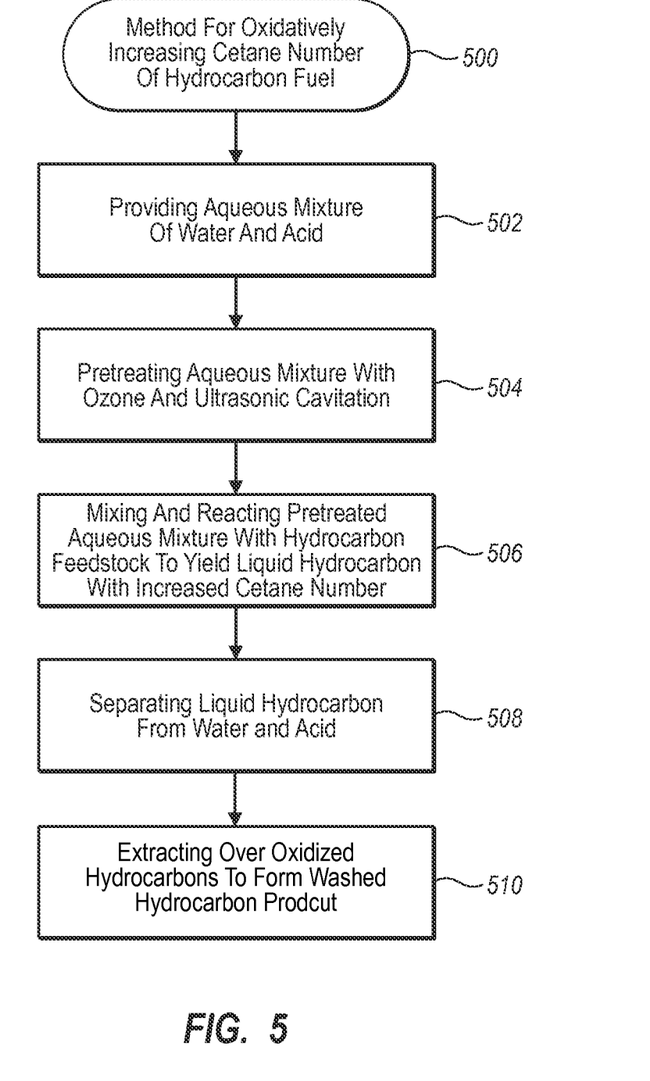
FIG. 5 is a flow diagram of an alternatively exemplary method of oxidatively increasing the cetane number of a liquid hydrocarbon.

FIG. 5 is a flow chart that illustrates an exemplary method 500 of increasing the cetane number of a liquid hydrocarbon (e.g., using the system 400 shown in FIG. 4 and/or the ultrasonic reactor 200 shown in FIG. 2). In a first step 502 water, acid and ozone are provided. The water and acid are typically provided as an aqueous mixture and the ozone as a separate stream. In a second step 504, the aqueous mixture and ozone are subjected to ultrasonic cavitation in order to form a pretreated aqueous mixture having reactive hydroxyl radicals formed therein. In a third step 506, the pretreated aqueous mixture is mixed and reacted together with a liquid hydrocarbon feedstream in order to yield an upgraded liquid hydrocarbon having an increased cetane number. In a fourth step 508, the upgraded liquid hydrocarbon product is separated from the water and acid. In a fifth step 510, over-oxidized hydrocarbons are extracted from the desired product using a polar solvent (e.g., methanol) to form a washed hydrocarbon product that is more stable and less reactive.

Figure 6:
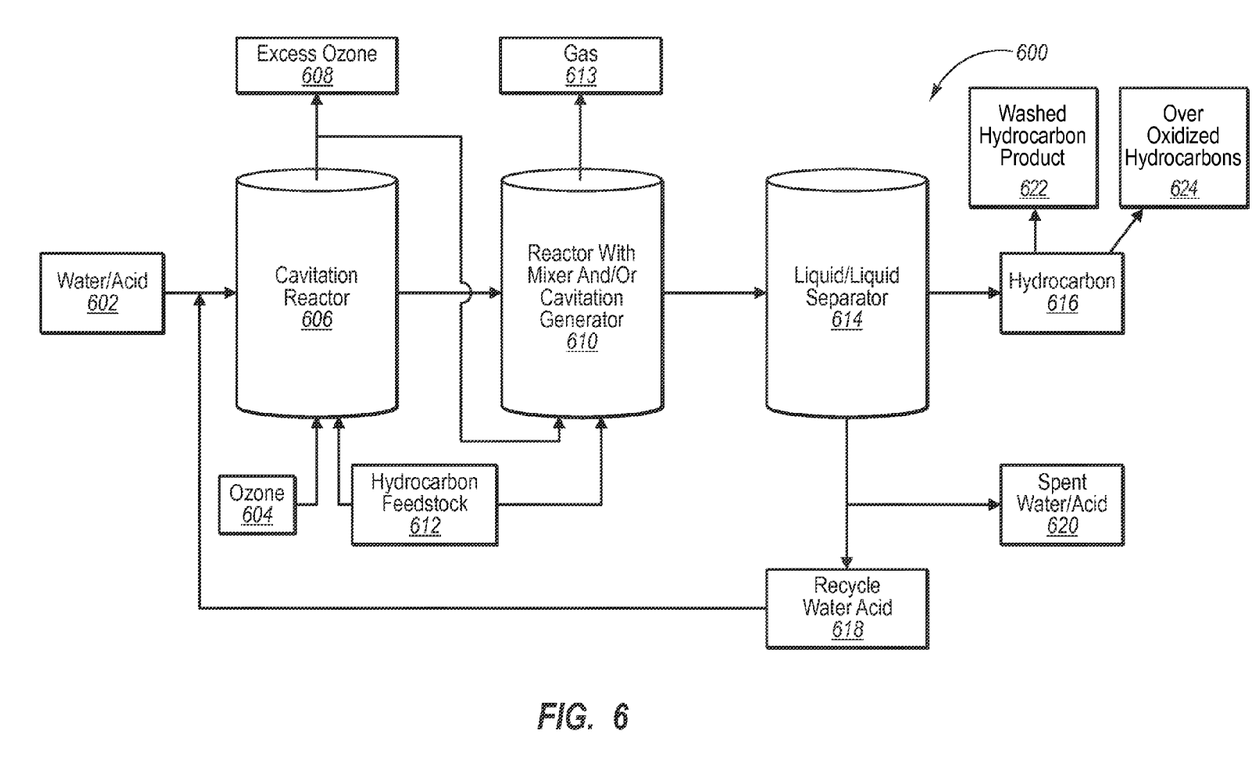
FIG. 6 schematically illustrates an alternative exemplary system for oxidatively increasing the cetane number of a liquid hydrocarbon.

FIG. 6 schematically depicts an alternative embodiment of a reaction system 600 for increasing the cetane number of a liquid hydrocarbon. In this embodiment, an aqueous mixture 602 comprised of water and an organic or inorganic acid, ozone 604, and a portion of a liquid hydrocarbon feedstock 612 are reacted together in a first cavitation reactor 606. The first cavitation reactor 606 can be any reactor that is able to create cavitation, as discussed herein. Excess ozone 408 can be removed from the top of first cavitation reactor 406 through a conduit or other venting means known in the art.

The reactants from first cavitation reactor 606, excess ozone 608, and a second portion of the liquid hydrocarbon feedstock 412 are introduced into second upgrading reactor 610, which includes means for mixing the reactants together. According to one embodiment, mixing may be provided at least in part by mechanical stirring. According to another embodiment, mixing may be provided at least in part by cavitation, as discussed herein. A combination of mechanical mixing and ultrasonic cavitation may be provided within second upgrading reactor 610 in order to promote beneficial oxygenation reactions of the liquid hydrocarbon. The reactants are maintained within the first cavitation reactor 606 and second upgrading reactor 610 for a time and at a temperature and pressure sufficient to carry out the desired oxygenation reaction in order to raise the cetane number of the liquid hydrocarbon product relative to the liquid hydrocarbon feedstock (e.g., see time, temperature and pressures set forth above relative to the embodiment of FIG. 1).

After the liquid hydrocarbon has been converted into a liquid hydrocarbon product having a higher cetane number (e.g., diesel fuel additive), the reactants are transferred from the second upgrading reactor 610 into a liquid/liquid separator 614, which separates an upgraded hydrocarbon product 616 from water and acid. Recycle water and acid 618 can be introduced back into first cavitation reactor 606. Excess (or "spent") water and acid 620 are separated from the recycle water and acid and discarded. The upgraded hydrocarbon product 616 can be washed using a polar solvent (e.g., methanol) to extract over-oxidized hydrocarbons and yield a washed hydrocarbon product 622 that is in a separate phase from the over-oxidized hydrocarbons 624. This waste polar fraction can be discarded as desired or it can be used as a fuel where heat is desired to drive a reaction.

The product that is produced by the foregoing systems and methods includes oxygenated hydrocarbon species. Oxygenates blended into diesel fuel can serve at least two purposes. First, they can improve cetane number compared to non-oxygenated diesel fuel. Components based on renewable feedstocks can provide the added benefit of reducing net emissions of greenhouse gases in the form of carbon dioxide emissions. Second, oxygenates blended into diesel fuel helps reduce particulate emissions and also oxides of nitrogen (NOx).

The foregoing systems and methods yield a product that can be characterized as "super cetane diesel" as it has a cetane number that is substantially higher than 55, typically higher than about 75, preferably higher than about 100. The super cetane diesel produced by the inventive systems and process can be used as a blending stock for diesel fuels having lower cetane numbers in order to yield blended diesel fuels having a desired cetane number.

By using the inventive process, the cetane number of a starting feedstock material can be increased by at least about 15%, preferably by at least about 20%, more preferably by at least about 30%, even more preferably by at least about 50%, and most preferably by at least about 75%. Such processes also result in an increase in cetane number of at least about 7.5, preferably at least about 10, more preferably at least about 15, even more preferably at least about 25, especially at least about 50, and most preferably at least about 75.

In many cases, the resulting product has a cetane number so high that it is best suited as a blending additive to raise the cetane number of a lower cetane number diesel fuel rather than as a diesel fuel by itself. According to one embodiment, the final blending stock can have a cetane number greater than about 60, preferably greater than about 75, more preferably greater than about 90, and most preferably greater than about 125.

The following examples of the invention are given by way of example only, and not by limitation. They are provided in order to illustrate particular methodologies for carrying out the invention. It will be understood that there are other ways, including other reaction conditions and reactants, that can be used to carry out the invention described herein.

For Examples 1-6, batch oxidation tests were conducted in a beaker using the following components:
Diesel—beginning cetane number=52
Acetic acid—100% purity; density=1.05 g/ml
Formic acid>98% purity; density=1.22 g/ml
Aqueous hydrogen peroxide—30% concentration; density=1.463 g/ml
Ozone—containing<1% ozone in a stream of air
Distilled water
Ultrasound device—Hielscher UP400S (400 watts, 24 kHz)

Comparative Example 1

With reference to U.S. Pat. No. 5,114,434 (Praulus et al.), 300 ml of diesel and 30 ml of aqueous hydrogen peroxide were placed into in a 500 ml beaker and vigorously stirred for 10 minutes at 25° C. using a magnetic stirrer. The resulting diesel product was then vigorously stirred with methanol in a ratio of 1 part methanol to 1 part diesel product to extract over-oxidized reaction products. The methanol washed diesel product was injected into an IQT machine manufactured by Advanced Engine Technology. The methanol washed diesel product as prepared according to the procedure described in U.S. Pat. No. 5,114,434 had a measured cetane number of 57, which was an increase of 5 over the initial cetane number of the starting diesel material.

Example 2

An aqueous solution comprised of 50 ml of acetic acid and 150 ml of distilled water was placed into a 500 ml beaker. A Hielscher UP400S ultrasound device was inserted into the beaker. Thereafter a stream of ozone-containing air was bubbled into the aqueous solution while the ultrasound device was turned on at 100% amplitude for 5 minutes. The resulting ozone-treated aqueous solution and 200 ml of diesel were vigorously stirred for 10 minutes using a magnetic stirrer. The resulting diesel product was then vigorously stirred with methanol (in a ratio of 1 part methanol to 1 part diesel) to extract over-oxidized reaction products. The methanol washed diesel product was injected into an IQT machine and determined to have a measured cetane number of 60.4, which was an increase of 8.4 over the initial cetane number of the starting diesel material.

Example 3

An aqueous solution consisting of 5 ml formic acid, 25 ml aqueous hydrogen peroxide, and 70 ml distilled water was placed into a 500 ml beaker together with 300 ml of diesel. A Hielscher UP400S ultrasound device was inserted into the beaker. Thereafter a stream of ozone-containing air was bubbled through the aqueous and diesel phases while the ultrasound device was turned on at 100% amplitude for 5 minutes. A very thick emulsion was formed at the end of test. The emulsion broke within 60 minutes. The resulting diesel product was washed with methanol as in Example 1 and 2 to extract over-oxidized reaction products. The methanol washed diesel product was injected into an IQT machine and determined to have a measured cetane number of 61, which was an increase of 9 over the initial cetane number of the starting diesel material.

Example 4

An aqueous solution consisting of 5 ml formic acid, 25 ml aqueous hydrogen peroxide was placed into a 500 ml beaker together with 300 ml of diesel. A Hielscher UP400S ultrasound device was inserted into the beaker. Thereafter a stream of ozone-containing air was bubbled through the aqueous and diesel phases while the ultrasound device was pulsed at a mode of 0.3 and 40% amplitude for 10 minutes. An emulsion was observed to form instantaneously, but which also broke rapidly. The resulting diesel product was washed with methanol to extract over-oxidized reaction products. The methanol washed diesel product was injected into an IQT machine and determined to have a measured cetane number of 62.0, which was an increase of 10 over the initial cetane number of the starting diesel material.

Example 5

An aqueous solution consisting of 5 ml formic acid, 25 ml aqueous hydrogen peroxide, and 70 ml distilled water was placed into a 500 ml beaker together with 300 ml of diesel. A Hielscher UP400S ultrasound device was inserted into the beaker and the mixture was subjected to ultrasound at 100% amplitude for 10 minutes. A very thick emulsion was formed at the end of test. The emulsion broke within 60 minutes. The resulting diesel product was washed with methanol as in previous examples to separate it from over-oxidized reaction products. The methanol washed diesel product was injected into an IQT machine and determined to have a measured cetane number of 64.2, which was an increase of 12.2 over the initial cetane number of the starting diesel material.

Example 6

An aqueous solution consisting of 5 ml formic acid and 5 ml of aqueous hydrogen peroxide was placed into a 500 ml beaker together with 300 ml of diesel. A Hielscher UP400S ultrasound device was inserted into the beaker and the mixture was subjected to ultrasound at 100% amplitude for 10 minutes while ozone containing air was continuously bubbled into the aqueous solution. An emulsion formed, which broke within 30 minutes after the test. The resulting diesel product was washed with methanol as in previous examples. The methanol washed diesel product was injected into an IQT machine and determined to have a cetane number of 62.4, which was an increase of 10.4 over the initial cetane number of the starting diesel material.

For comparison purposes, the conditions and results of Examples 1-6 are set forth in Table 1 below:

TABLE 1

| | Example | | | | | |
|---|---|---|---|---|---|---|
| | 1 | 2 | 3 | 4 | 5 | 6 |
| Acid - acetic(A) or formic(F) | | 50 ml-(A) | 5 ml-(F) | 5 ml-(F) | 5 ml-(F) | 5 ml-(F) |
| Hydrogen peroxide, ml | 30 ml | | 25 | 25 | 25 | 5 |
| Distilled water, ml | | 150 | 70 | | 70 | |
| Ozone | | Yes | Yes | Yes | None | Yes |
| Ultrasound intensity | | Maximum | Maximum | 40% at 0.3 | Maximum | Maximum |
| Time, minute | 10 | 5 | 5 | 10 | 10 | 10 |
| Magnetic stirrer | yes | Yes | | | | |
| Diesel, ml | 300 | 300 | 300 | 300 | 300 | 300 |
| Measured cetane number | 57.8 | 60.4 | 61 | 62 | 64.2 | 62.4 |
| Change in cetane number compared to original diesel | 5.8 | 8.4 | 9 | 10 | 12.2 | 10.4 |
| Percentage change in cetane number compared to original diesel | 11.2% | 16.2% | 17.3% | 19.2% | 23.5% | 20% |

As seen in Table 1, all test conditions that were run according to the present invention (Examples 2 to 6) show a significantly higher increase in cetane number compared to the test that was run according to Comparative Example 1.

Introducing ultrasound into the reaction vessel, even for just 5 minutes, significantly increased the cetane number over Comparative Example 1, which is a surprising and unexpected result. In continuous flow tests and at optimum conditions, the inventors expect much higher cetane numbers using the inventive process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for oxidatively increasing the cetane number of a liquid hydrocarbon, comprising:
    providing a liquid hydrocarbon feedstock having an initial cetane number, the liquid hydrocarbon feedstock comprising at least one member selected from the group consisting of:
        diesel;
        liquid hydrocarbons having a boiling range of about 150° C. to about 380° C. selected from refinery streams, straight petroleum runs, thermally cracked hydrocarbons, catalytically cracked hydrocarbons, hydrocracked hydrocarbons, biodiesels, vegetable oils, and animal fats; and
        materials produced by visbreaking at least one of bright stock, used lubricating oil, and gas oil with a boiling point in a range of about 200° C. to about 500° C.;
    providing a separate stream comprising an oxidation source and acid;
    introducing the liquid hydrocarbon feedstock and the separate stream comprising the oxidation source and the acid, and optionally a catalyst, into a first cavitation reactor; and
    mixing together and promoting cetane-increasing oxidation reactions between the liquid hydrocarbon feedstock, oxidation source, and optional catalyst in the first cavitation reactor and operating the cavitation reactor with a cooling or heat exchange apparatus in order to control the temperature inside the cavitation reactor and in order to oxygenate the liquid hydrocarbon feedstock, minimize oxidation of sulfur-containing compounds, and avoid transformation of sulfur-containing compounds into oxygenated compounds that are more water rather than oil soluble to thereby yield a liquid hydrocarbon product comprising oxidized hydrocarbons and having a final cetane number that is at least about 15% higher than the initial cetane number of the liquid hydrocarbon feedstock.

2. A method as defined in claim 1, wherein the cavitation reactor is operated at a temperature in a range of about 20° C. to about 200° C., at a pressure in a range of about 1 bar to about 30 bars, and for a time period in a range of about 3 minutes to about 90 minutes.

3. A method as defined in claim 1, wherein the cavitation reactor is operated at a temperature in a range of about 30° C. to about 180° C., at a pressure in a range of about 3 bars to about 25 bars, and for a time period in a range of about 5 minutes to about 60 minutes.

4. A method as defined in claim 1, wherein the cavitation reactor is operated at a temperature in a range of about 40° C.

to about 80° C., at a pressure in a range of about 5 bars to about 20 bars, and for a time period in a range of about 8 minutes to about 40 minutes.

5. A method as defined in claim 1, further comprising promoting cetane-increasing oxygenation reactions utilizing one or more additional cavitation reactors in series in addition to the first cavitation reactor.

6. A method as defined in claim 1, the oxidation source comprising at least one member selected from the group consisting of aqueous hydrogen peroxide, organic peroxides, inorganic peroxides, and ozone, wherein the liquid hydrocarbon feedstock and oxidation source are not pre-mixed but added separately in different streams to the first cavitation reactor.

7. A method as defined in claim 1, the catalyst being included and comprising at least one metal selected from the group consisting of iron, nickel, vanadium, and molybdenum.

8. A method as defined in claim 1, the acid comprising at least one organic acid.

9. A method as defined in claim 8, the organic acid comprising at least one of acetic acid, formic acid, oxalic acid, or benzoic acid.

10. A method as defined in claim 1, the acid comprising at least one inorganic acid.

11. A method as defined in claim 10, the inorganic acid comprising at least one of sulfuric acid, nitric acid, or hydrochloric acid.

12. A method as defined in claim 1, wherein cavitation is provided by ultrasonic cavitation.

13. A method as defined in claim 1, wherein cavitation is provided by one or more of a spinning rotor, an oscillating magnetic field, hydrodynamic flow of liquid reactants within the cavitation reactor, optic cavitation, or particle cavitation.

14. A method as defined in claim 1, further comprising separating the liquid hydrocarbon product from light hydrocarbon gases, water, catalyst, and oxidation source by means of phase separation.

15. A method as defined in claim 14, further comprising recycling at least a portion of the liquid hydrocarbon product back into the first cavitation reactor.

16. A method as defined in claim 14, further comprising recycling at least a portion the oxidation source, acid, and optional catalyst back into the first cavitation reactor.

17. A method as defined in claim 14, further comprising removing over-oxidized hydrocarbons from the liquid hydrocarbon product to form a more purified hydrocarbon product.

18. A method for oxidatively increasing the cetane number of a liquid hydrocarbon, comprising:
    introducing an oxidation source and an aqueous mixture comprised of water and acid into an ultrasonic cavitation reactor;
    subjecting the aqueous mixture and oxidation source to ultrasonic cavitation to yield a pretreated aqueous mixture having hydroxyl radicals;
    introducing the pretreated aqueous mixture, a liquid hydrocarbon feedstock having an initial cetane number, and optionally a catalyst into an upgrading reactor; and
    mixing together the liquid hydrocarbon feedstock, the pretreated aqueous mixture, and optionally a catalyst within the upgrading reactor in order to oxygenate the liquid hydrocarbon feedstock while minimizing oxidation of sulfur-containing compounds and thereby yield a liquid hydrocarbon product having a final cetane number that it at least about 20% higher than the initial cetane number.

19. A method as defined in claim 18, wherein the oxidation source comprises ozone.

20. A method as defined in claim 18, the liquid hydrocarbon feedstock having a boiling point in a range of about 150° C. to about 380° C. and comprising at least one material selected from the group consisting of refinery streams, straight petroleum runs, thermally cracked hydrocarbons, catalytically cracked hydrocarbons, hydrocracked hydrocarbons, biodiesels, vegetable oils, and animal fats.

21. A method as defined in claim 18, wherein mixing together the liquid hydrocarbon feedstock and the pretreated aqueous mixture within the upgrading reactor is performed at least in part using cavitation.

22. A method as defined in claim 21, wherein cavitation is provided using ultrasonic cavitation.

23. A method as defined in claim 18, wherein mixing together the liquid hydrocarbon feedstock and the pretreated aqueous mixture within the upgrading reactor is performed at least in part by stirring.

24. A method as defined in claim 18, wherein the upgrading reactor is operated at a temperature in a range of about 20° C. to about 200° C., at a pressure in a range of about 1 bar to about 30 bars, and for a time period in a range of about 3 minutes to about 90 minutes.

25. A method as defined in claim 18, wherein the upgrading reactor is operated at a temperature in a range of about 30° C. to about 180° C., at a pressure in a range of about 3 bars to about 25 bars, and for a time period in a range of about 5 minutes to about 60 minutes.

26. A method as defined in claim 18, further comprising separating the liquid hydrocarbon product from hydrocarbon gases, water, catalyst, and oxidation source by at least one of phase separation and solvent extraction.

27. A method for oxidatively increasing the cetane number of a liquid hydrocarbon to form a super cetane hydrocarbon suitable as a blending stock, comprising:
    providing a liquid hydrocarbon feedstock having an initial cetane number;
    introducing a first portion of the liquid hydrocarbon feedstock into a first cavitation reactor together with an oxidation source, an acid, separate from the oxidation source, selected from the group consisting of organic acids, sulfuric acid, nitric acid, and hydrochloric acid, and optionally a catalyst;
    mixing together and promoting cetane-increasing reactions between the liquid hydrocarbon feedstock, oxidation source, and optional catalyst in the first cavitation reactor in order to oxygenate the liquid hydrocarbon feedstock, and thereby yield a liquid hydrocarbon product having a final cetane number that is at least about 15% higher than the initial cetane number of the liquid hydrocarbon feedstock; and
    introducing the liquid hydrocarbon product and residual oxidation source and optional catalyst from the first cavitation reactor and also a second portion of the liquid hydrocarbon feedstock into a second cavitation reactor in order to oxygenate the liquid hydrocarbon product and the second portion of the liquid hydrocarbon feedstock,
    the method yielding a super cetane hydrocarbon having a cetane number greater than 90.

28. A method as defined in claim 1, wherein the cavitation reactor is operated at a temperature in a range from about 20° C. to less than 80° C.

29. A method as defined in claim 1, wherein the method results in an increase in cetane number of the liquid hydrocarbon feedstock of at least about 50.

30. A method as defined in claim 1, wherein the method results in an increase in cetane number of the liquid hydrocarbon feedstock of at least about 75.

31. A method as defined in claim 1, wherein the method results in a cetane number of at least about 90.

* * * * *

UNITED STATES PATENT AND TRADEMARK OFFICE
CERTIFICATE OF CORRECTION

| | | |
|---|---|---|
| PATENT NO. | : 8,920,633 B2 | Page 1 of 1 |
| APPLICATION NO. | : 12/877484 | |
| DATED | : December 30, 2014 | |
| INVENTOR(S) | : Chan et al. | |

It is certified that error appears in the above-identified patent and that said Letters Patent is hereby corrected as shown below:

In the Specification

Column 2
Line 24, change "much a higher" to --a much higher--

Column 3
Line 5, change "that it at least" to --that is at least--

Column 7
Line 20, change "week" to --weak--

Column 10
Line 30, change "ozone 408" to --ozone 608--
Line 31, change "reactor 406" to --reactor 606--
Line 35, change "feedstock 412" to --feedstock 612--

Signed and Sealed this
First Day of March, 2016

Michelle K. Lee
*Director of the United States Patent and Trademark Office*